US006871184B1

(12) United States Patent
Liberman

(10) Patent No.: US 6,871,184 B1
(45) Date of Patent: Mar. 22, 2005

(54) METHOD OF DELIVERING GROCERIES PURCHASED OVER THE INTERNET

(76) Inventor: Barnet L. Liberman, 421 Hudson St., New York, NY (US) 10014

( * ) Notice: Subject to any disclaimer, the term of this patent is extended or adjusted under 35 U.S.C. 154(b) by 483 days.

(21) Appl. No.: 09/587,201

(22) Filed: Jun. 5, 2000

(51) Int. Cl.[7] .............................................. G06F 17/60
(52) U.S. Cl. ........................... 705/15; 383/97; 383/120
(58) Field of Search ........................... 705/15, 7, 8, 16, 705/22; 383/76, 97, 120, 111, 41, 5; 150/102

(56) References Cited

U.S. PATENT DOCUMENTS

| 76,297 A | * | 4/1868 | Brosius | 150/134 |
|---|---|---|---|---|
| 338,846 A | * | 3/1886 | Kimber | 190/101 |
| 795,560 A | * | 7/1905 | Stinson | 383/22 |

(List continued on next page.)

FOREIGN PATENT DOCUMENTS

| GB | 438 189 | 11/1935 | |
|---|---|---|---|
| GB | 1 549 854 | 8/1979 | |
| GB | 2 233436 | 1/1991 | |
| JP | 60084664 A | * 10/1983 | ........... G06F/15/21 |
| WO | WO/00/09841 | 2/2000 | |
| WO | WO/00/68856 | 11/2000 | |

OTHER PUBLICATIONS

Peapod.com Website, www.peapod.com, published Jun. 29, 1998. "Peapod I".*
White, Ron, How Computers Work Millennium Ed. Que Corporation, Sep. 1999.*
Derfler, Frank J. et. al. How Networks Work, Millennium Ed., Que Corporation, Jan. 2000.*
Gralla, Preston, How the Internet Works, Millennium Ed., Que Corporation, Aug. 1999.*
Welcome to Webvan.com / 1 web page from www.webvan.com web site (Nov. 10, 2000).
HomeGrocer.com / 1 web page from www.homegrocer.com web site (Nov. 10, 2000).
NetGrocer.com / 1 web page from www.netgrocer.com web site (Nov. 10, 2000).
Peapod.com / 2 pages from www.peapod.com web site (Apr. 12, 2000).
YourGrocer.com / 7 web pages from www.yourgrocer.com web site (Nov. 10, 2000).

*Primary Examiner*—Andrew J. Fischer
(74) *Attorney, Agent, or Firm*—Cohen, Pontani, Lieberman & Pavane

(57) ABSTRACT

Groceries ordered over the Internet by a particular time in the early evening may be delivered by the next morning to a location within a 5–6 hour delivery radius of a warehouse. The grocery order is filled at the warehouse, where the groceries are placed in a tote for delivery. If perishable groceries are to be delivered, a frozen insert is placed in the tote to maintain the groceries at a desired temperature. The filled tote is placed on a rack, which is removable with the tote on it. The racks have shelves that are pitched such that when a first tote is removed a second tote behind the first tote falls into the space previously occupied by the first tote. In the early evening, after the cutoff time for placing orders, the rack and totes on the rack are transferred to a first vehicle, typically a large trailer, that transports the rack and totes to a transfer point where the rack and the accompanying bill of lading are transferred to a second smaller vehicle, such as a van. The van delivers the totes to customers along a pre-established route. Upon reaching a delivery destination (usually a customer's home) by early the next morning, the van driver removes the tote for that customer from the van and secures it in a locked expandable bag, such as a mesh net or insulated bag, that may be locked in two places and that is itself secured to a grocery box. The grocery box, which is supplied to the customer by the business selling the groceries, is secured outside the delivery destination. The customer removes the tote from the bag, removes the groceries from the tote, and returns the used tote to the bas for later pickup by the van.

1 Claim, 10 Drawing Sheets

U.S. PATENT DOCUMENTS

| | | | | | |
|---|---|---|---|---|---|
| 934,230 | A | * | 9/1909 | Steinman | 232/42 |
| 1,034,050 | A | * | 7/1912 | Williams | 70/58 |
| 2,128,689 | A | * | 8/1938 | Bingham | 383/41 |
| 2,159,279 | A | * | 5/1939 | Lipowsky et al. | 383/22 |
| 2,301,639 | A | * | 11/1942 | Onstott | 414/498 |
| 2,310,627 | A | * | 2/1943 | Greene | 70/68 |
| 2,589,768 | A | * | 3/1952 | Wilson | 49/356 |
| 2,710,639 | A | * | 6/1955 | Faris | 383/26 |
| 3,237,721 | A | * | 3/1966 | Thompson | 186/54 |
| 3,628,807 | A | * | 12/1971 | Fullington et al. | 280/79.3 |
| 4,037,853 | A | * | 7/1977 | Sparks | 280/204 |
| D328,550 | S | * | 8/1992 | Mogil et al. | 29/560.1 |
| 5,624,071 | A | | 4/1997 | Sosan | |
| 5,774,053 | A | * | 6/1998 | Porter | 340/568.1 |
| 5,848,399 | A | * | 12/1998 | Burke | 705/27 |
| 5,979,750 | A | * | 11/1999 | Kindell | 232/19 |
| 6,026,376 | A | * | 2/2000 | Kenney | 705/27 |
| 6,026,377 | A | * | 2/2000 | Burke | 705/27 |
| 6,155,715 | A | * | 12/2000 | Lake et al. | 383/6 |
| 6,204,763 | B1 | * | 3/2001 | Sone | 340/568.1 |
| 6,246,998 | B1 | * | 6/2001 | Matsumori | 705/27 |
| 6,249,773 | B1 | * | 6/2001 | Allard et al. | 705/26 |
| 6,304,855 | B1 | * | 10/2001 | Burke | 705/27 |
| 6,339,764 | B1 | * | 1/2002 | Livesay et al. | 705/28 |
| 6,347,737 | B1 | * | 2/2002 | Madruga | 232/47 |
| 6,381,583 | B1 | * | 4/2002 | Kenney | 705/26 |
| 6,418,416 | B1 | * | 7/2002 | Rosenberg et al. | 705/28 |
| 6,426,699 | B1 | * | 7/2002 | Porter | 340/568.1 |
| 6,510,383 | B1 | * | 1/2003 | Jones | 701/209 |
| 6,513,017 | B1 | * | 1/2003 | Howard et al. | 705/28 |
| 6,612,489 | B2 | * | 9/2003 | McCormick et al. | 235/382 |
| 6,622,127 | B1 | * | 9/2003 | Klots et al. | 705/28 |

* cited by examiner

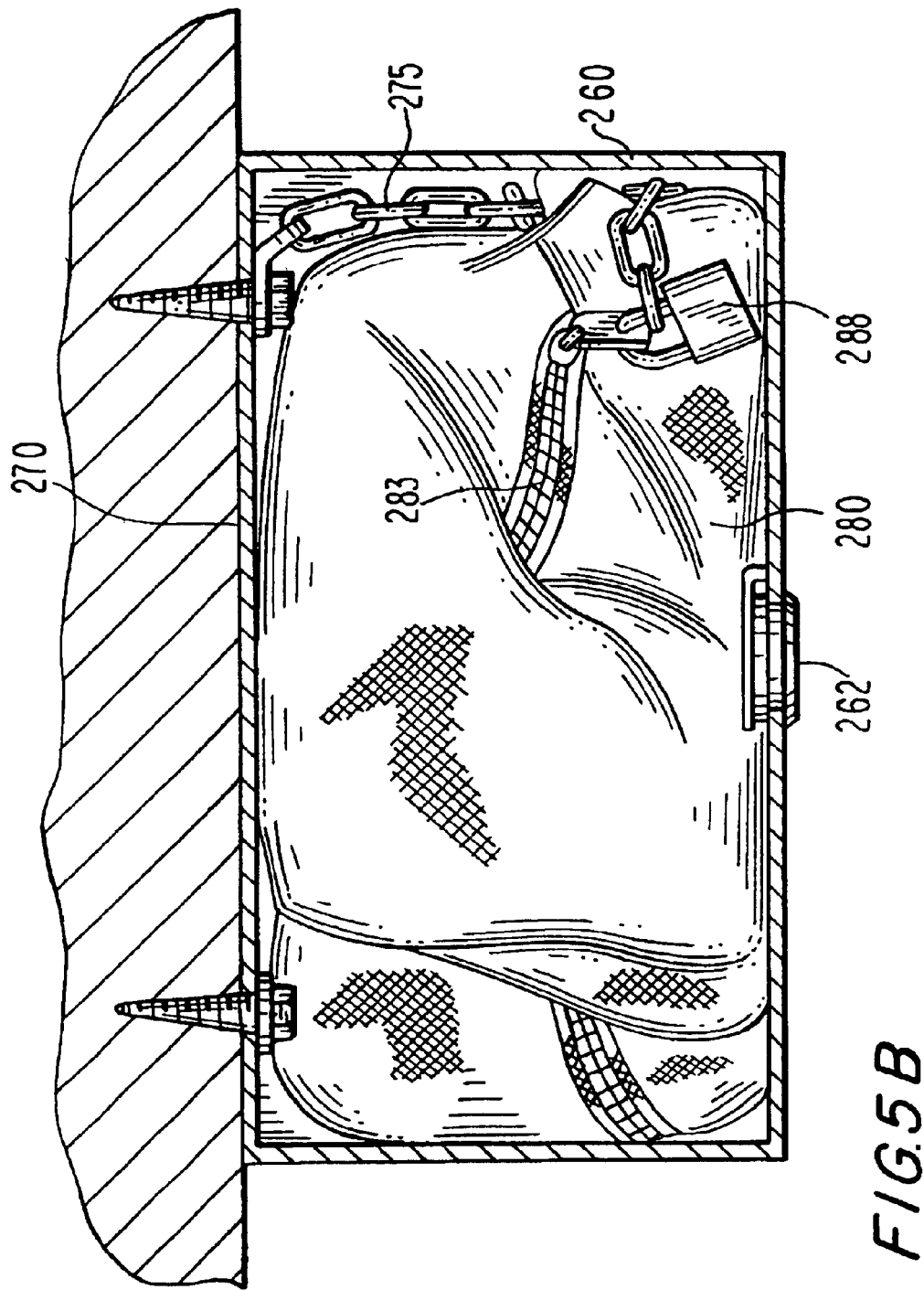

METHOD OF DELIVERING GROCERIES PURCHASED OVER THE INTERNET

BACKGROUND OF THE INVENTION

1. Field of the Invention

This invention relates to a method for distributing groceries that are ordered over the Internet, or by some other remote means such as by phone, email, or fax.

2. Description of the Related Art

Some grocers have in recent years sought to develop businesses in which a full line of groceries may be sold over the Internet as an alternative to in-store sales. Selling merchandise over the Internet eliminates the need to maintain an abundance of sales personnel and thereby reduces costs. However, costs remain unnecessarily high for these Internet grocers because they have sought to emulate the business model of a conventional supermarket. Thus, they offer a full array of products, including both perishable and non-perishable items, and promise quick delivery, such as delivery within 30 minutes.

To meet these goals, the Internet grocers have established an abundance of warehouses for stocking the groceries in close proximity to each service area to which the groceries are to be delivered. The amount of capital required to maintain multiple warehouses in each neighborhood has limited the potential to achieve profitability as well as the business' ability to expand the number of areas they can service.

Moreover, in the existing business model, delivery people also serve as customer service personnel who interact with the customers by handling customer orders and complaints. It is difficult to find an abundance of qualified people who have the requisite customer relations skills and who are willing to perform such multiple responsibilities at a reasonable cost, particularly during prosperous economic times when the available labor pool is relatively small.

In an effort to service areas outside their local delivery areas, some Internet grocers offer to ship non-perishable groceries via an overnight delivery service. But the Internet grocers have found it challenging, if not impossible, to find an economical method of delivering perishable groceries, including dairy products, meats, frozen goods, and fresh fruits and vegetables outside of their local delivery areas without the groceries becoming spoiled. Perishables may be delivered without spoilage in refrigerated delivery trucks. However, refrigerating the delivery trucks is extremely expensive, results in increased pollution levels, and wastes a great deal of energy, particularly where the truck is filled with both perishables as well as non-perishables that do not require refrigeration.

It would be advantageous to have an alternative method of quickly and economically delivering groceries, which requires fewer resources, including fewer customer service personnel, and less capital outlay per area served.

SUMMARY OF THE INVENTION

It is an object of this invention to provide a method of doing business in which fresh and frozen products, as well as dry goods, may be delivered to the consumer quickly, efficiently, economically, and in an environmentally responsible way.

The present invention provides a method of distributing groceries ordered by a customer over the Internet, by email, by fax, or by some other means. Customers place their orders by an early evening cutoff time for delivery of items on the following morning. If the deliveries are not placed by the cutoff time, delivery of the items will be delayed by one day. The grocery order is filled by a clerk at a warehouse within a 5–6 hour delivery radius of the delivery destination specified by the customer. The clerk places the groceries in a tote, which may be partitioned into at least two sections. To serve a larger area with a larger radius while maintaining the 5–6 hour delivery time, one or more additional warehouses will be established. Means for maintaining the groceries at a desired chilled temperature are introduced into the tote when perishable groceries are to be delivered. These means may be, but are not limited to, a frozen insert placed into the tote before the tote is sealed or a chilled gas pumped into a portion of the tote.

After being sealed and filled with chilled gas (if necessary) the tote is placed on a rack that is mounted by a bracket or similar means onto a rack holder. The rack holder may have rollers on the bottom to enable the rack holder to be rolled with the racks thereon from place to place. The rack is removable from the rack holder with the tote on it and is pitched or biased such that when a first tote is removed a second tote behind the first tote falls into the space of the first tote. There will generally be multiple racks of totes for delivery each day.

After the rack of totes is prepared for shipping, which is usually after the order cutoff time, the rack with the totes thereon is transferred to a first vehicle, typically a large trailer, that transports the rack (and totes) to a transfer point somewhere between the warehouse that filled the order and the delivery destination. At the transfer point, the rack is transferred to a second smaller vehicle, such as a van. The transfer occurs usually in the late evening or early the next morning. The van then delivers the totes to customers along its route.

Upon reaching a delivery destination, usually a customer's home, by early the next morning, the van driver removes the tote from the van for that customer and places it in a specially designed expandable bag, supplied to the customer along with a sturdy, relatively small box in which the bag is stored when the bag is not in use. The box is permanently affixed to a post, such as to the ground or a door. Given its use in a method of delivering groceries, the box is referred to herein, for convenience, as a grocery box, although no groceries are necessarily placed within the box. The bag, which may be a mesh net, or insulated bag or some other type of secure bag, is secured by a cable or a chain to the box. An opening in the bag through which the tote is inserted is generally kept locked. Access to the bag may be available through two separate locks to permit separate access for the van driver and the customer.

To place the tote in the bag, the van driver removes the locked bag from the grocery box, opens a first of the two locks to gain access to the inside of the bag, inserts the tote in the bag, locks the first lock, and leaves the bag containing the tote on the ground near the grocery box while the bag remains secured to the grocery box. The totes remain locked in the bag until the customer opens the second lock, removes the tote, closes the second lock and places the locked bag back into the grocery box. The customer thereafter removes the groceries from the tote and returns the emptied tote to the bag outside the grocery box before the next expected delivery to that customer. The delivery driver picks up any emptied totes during the next delivery to the customer. The emptied totes are nestable within one another, allowing more than one emptied tote to be placed in the bag for return to the grocer. Rather than placing the bag with the tote outside the grocery box, a grocer may supply the customer with a grocery box large enough to place the bag along with the enclosed tote inside the grocery box.

The box and the attached bag may be similarly used to securely store any type of delivered item, outside a deliver destination, whether or not the item is placed in a tote.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 5B is a cross-sectional view of the grocery box of FIG. 5A along line 5B—5B with a bag collapsed within the grocery box;

DETAILED DESCRIPTION OF THE PRESENTLY PREFERRED EMBODIMENTS

Figure 1:
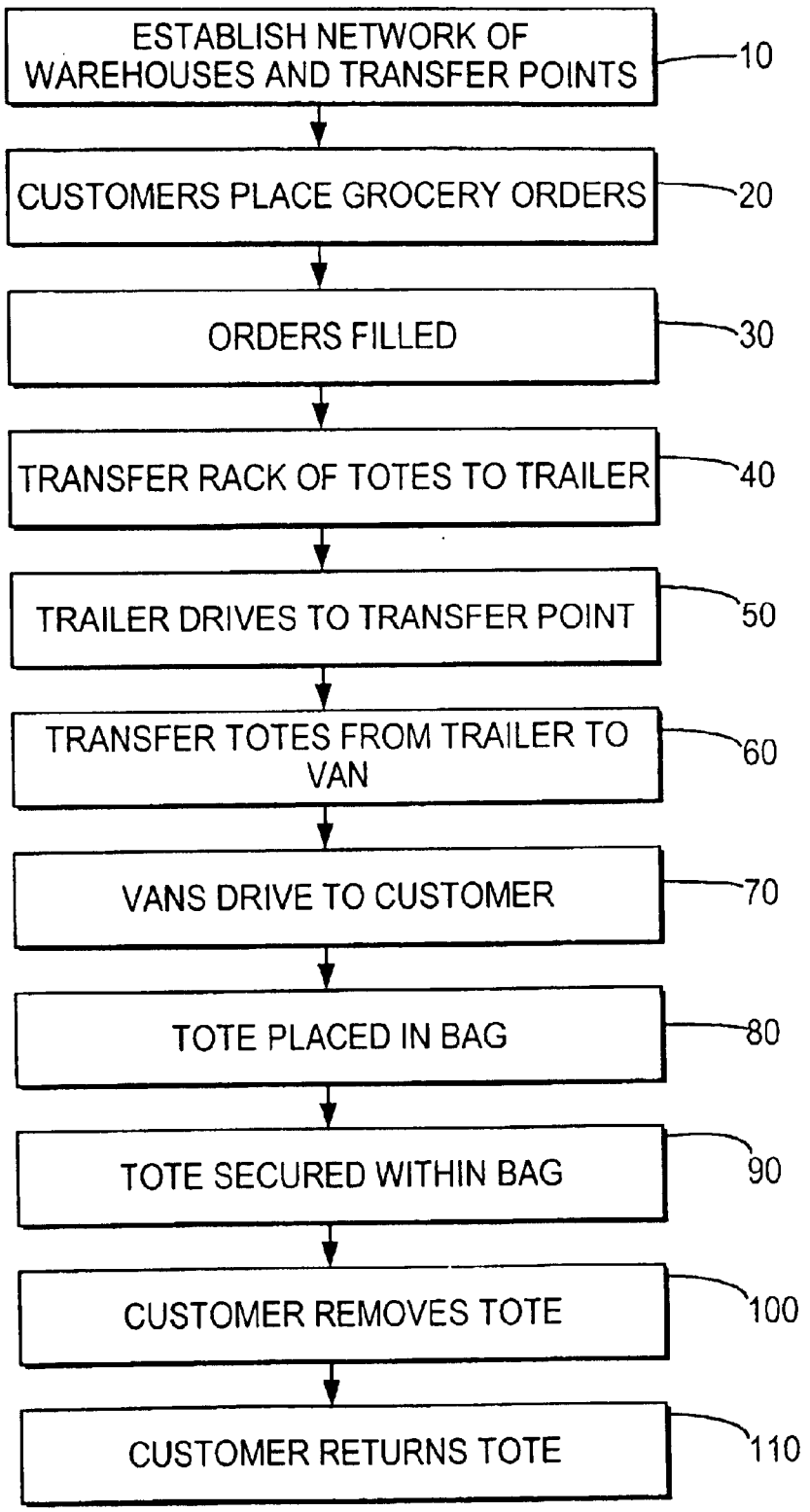
FIG. 1 is a flow chart illustrating the steps for practicing the method of the present invention.
Figure 2:
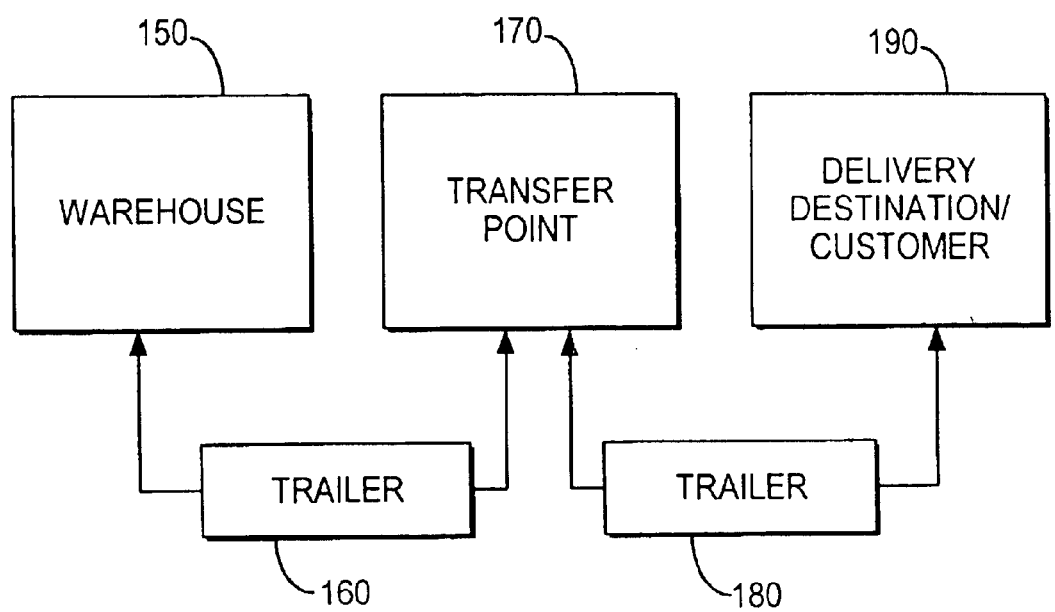
FIG. 2 is a block diagram of the distribution system for practicing the present invention, including the various locations between which the groceries are transported and the methods of transporting the groceries between these locations.

FIG. 1 illustrates the steps for practicing the method of the present invention. At step 10, a business establishes a network of warehouses 150 and transfer points 170, shown in FIG. 2. Warehouses 150 are generally designed to be large enough to stock a large variety of products, some requiring refrigeration, and to maximize turnover and variety. Transfer points 170 located at points between the warehouses and a cluster of potential customers' homes (or some other delivery destination) 190 are established as locations at which large trailers 160 transporting the groceries can transfer the groceries to smaller transport delivery vehicles like vans 180 to deliver the groceries to the customers' homes 190. As an alternative to trailers 160, other means of transportation like rail lines (not shown) may be used to transport the groceries to transfer points 160. The warehouses 150 are situated such that there is an approximately a 5 to 6 hour travel radius from any warehouse 150 in the network to a customer's delivery location, e.g., home, including the time it takes to transfer groceries between trailers 160 and vans 180 at transfer points 170. Because travel times for a given distance may vary due to traffic congestion, speed limits, or other reasons, the appropriate distances to achieve a maximum acceptable travel radius will have to be determined at the time the locations for the warehouses are selected. This problem should be reduced by confining deliveries to the late night/ early morning time frame. Placement of the warehouses 150 should also take into consideration whether the potential location can attract an adequate labor pool of part-time order packers who can staff the warehouses 150 in the early evening.

Figure 3:
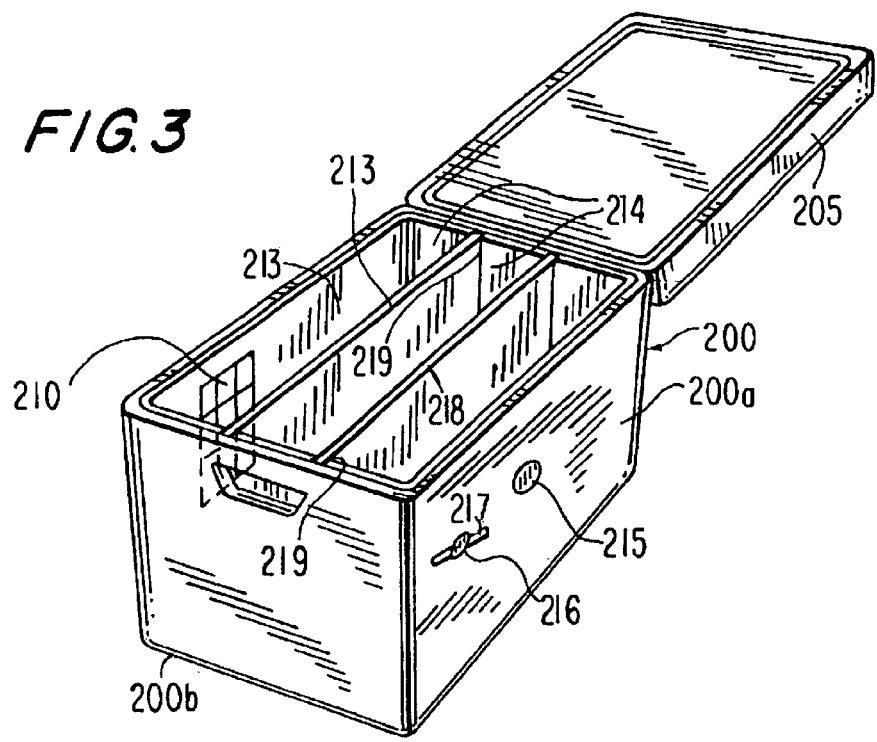
FIG. 3 is an isometric view of a tote used for transporting the groceries.

Customers place orders for groceries at step 20. The orders may be placed at any time via the Internet, such as by accessing a designated Web site, e-mail, or by phone, or fax, or by standing order in which a customer specifies groceries to be delivered on a regular basis, or by any other means, and are received by the grocery supply establishment. For various reasons, including efficiency, simplicity, and minimizing staffing, the Internet is a preferred means of accepting orders. Customers must place their orders by some early evening cutoff point, such as 7 p.m., in order to receive their orders by the next day. (More remote locations may have an earlier cutoff point, such as at 5 or 6 p.m.) At step 30, the orders are filled at warehouses 150 by personnel, mostly part-time employees, who select the grocery items ordered (and any other non-grocery items sold by the business and stocked at the warehouse) off the appropriate shelves in the warehouse and load the groceries ordered by a particular customer into an appropriately-sized tote 200 (FIG. 3) or in a portion of tote 200.

Totes 200, which may come in different sizes (one possible size is 12"H×12"W×24"L), may be made of a sturdy, washable material, such as a strong plastic designed to hold dry goods, refrigerated, and frozen products within a cavity 213 in the tote, and have a cover 205 to seal the cavity 213 of tote 200. The cavity 213 of tote 200 may be partitioned into multiple sections 217 with an insulated material 218 held within vertical grooves 219 cut at intervals along the length or width of cavity 213. For example, where a tote is 12"H×12"W×24"L, grooves 219 may be cut every 2 inches along the width of tote 200 at points between 4" to 16" from a first side 200a of the tote. The partition may also extend into the bottom 200b and cover 205 of tote 200 so that a section of the tote 200 can be pressurized with a chilled gas, like carbon dioxide or nitrogen, as described below.

The groceries are kept at a desired chilled temperature, whether frozen or refrigerated, within totes 200 or within sections 214 of totes 200. This may be accomplished in various ways. For example, a frozen insert 210 containing an appropriate mix of frozen cells, such as a belt of encapsulated ice substitute described in U.S. Pat. No. 5,860,202 entitled Process for Preparing Ice Substitutes may be inserted as a lining in the tote 200. The tote can then be sealed with cover 205. Another means of freezing or refrigerating the groceries within totes 200 is by first sealing tote 200 and then introducing a chilled gas, such as chilled nitrogen or carbon dioxide via a gas feed tube 215 on the side or cover of tote 200. The chilled gas may be introduced into the entire tote 200 or only a section 214 of the tote 200. A pressure relief valve 216 has a mechanism (not shown) for opening the valve and releasing the gas before cover 205 is removed from a sealed tote 200 and may be equipped with a safety two stage opening clip 217 to allow the chilled gas to escape in a controlled manner if valve 216 fails.

Where a frozen insert 210 is used, different combinations of cells having different freezing points may be used to maintain a desired temperature having two points at which the heat of fusion is absorbed to maintain the desired temperature for a longer time in combination with any insulation provided by the shell of or lining on the interior of tote 200. It is desirable to provide sufficient refrigeration and insulation to maintain the desired temperature for at least 16 hours in an 80° F. atmosphere. If the groceries do not completely fill tote 200, packaging materials, such as Styrofoam or bladders, may be used to fill any voids in tote 200. The size of the tote 200 used to fill an order and the amount of fill need to fill a void in a tote 200 may be readily determined in any known manner at the time the order is entered on the Internet.

Figure 4:
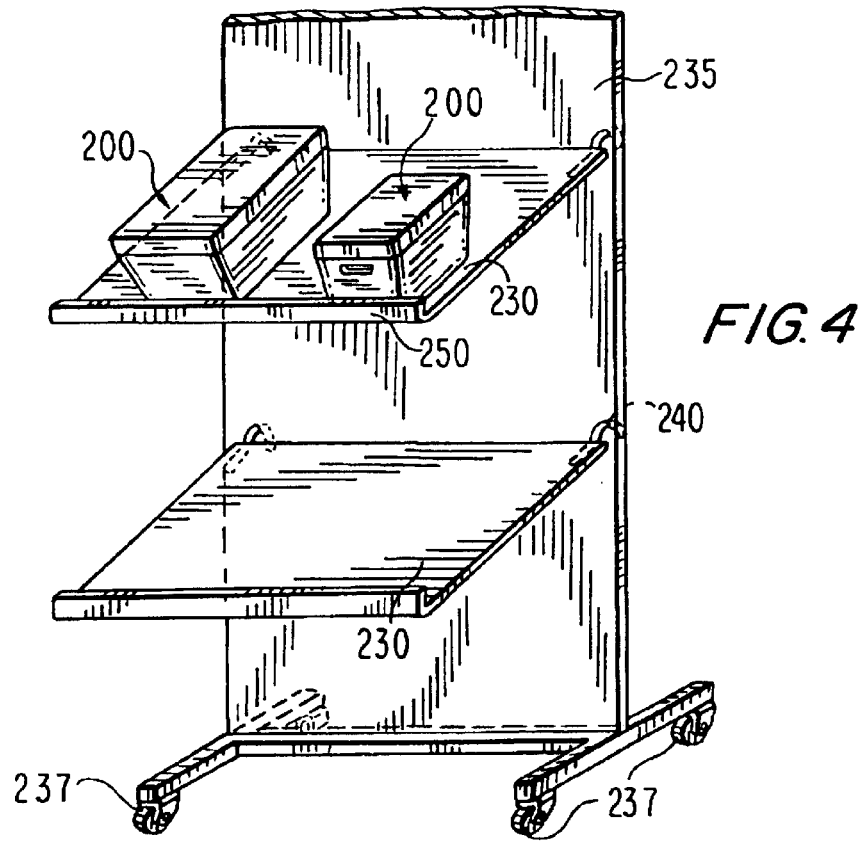
FIG. 4 is an isometric view of a portion of a rack holder having pitched shelves on which the totes of groceries are placed.

After an order is processed, the filled tote 200 is loaded onto racks 230 which are mounted on rack holders 235 in the warehouse 150 (FIG. 4). Rack holders 235 may have rollers 237 on their legs to allow them to be rolled from place to place. The racks 230 have a mounting means, which may be any conventional means of mounting racks such as one or more brackets 240, to mount the racks 230 so they can be loaded with heavy totes 200 of groceries and be removed with the totes 200 on them, such as manually or by forklift. As with the totes 200, racks 230 may be any appropriate size on which the totes 200 may be placed. An appropriate size for each of racks 230 will depend on the van or other delivery vehicle configuration but two useful sizes of racks 230 may be approximately 6 cubic feet (6'×6'×6') and 4'×8'×8'.

After the cutoff time for ordering (which in the present example is 7 p.m.), racks 230 are transferred within a desired time frame, e.g., between 7 and 9 p.m., from the warehouse 150 and are loaded onto trailers 160 where racks 230 are mounted on rack holders (not shown), similar to rack holders 235, for transport (or rack holders 235 that have rollers may be rolled from a loading dock at the warehouse 150 onto trailer 160). Trailers 160 may be equipped with a high/low, as on masonry trucks, to load and off load. The racks are slightly pitched downward over an angle θ so that after removal of a tote 200 from the front of rack 230, the next tote 200 behind the removed tote would fall into the space previously occupied by the first tote by gravity and/or the agitation of the truck's normal movement and/or by use of a pushing mechanism or biasing means such as a spring (not shown). A lip 250 along the front edge or rack 230 prevents the totes 200 from falling off the racks 230. When a pitch is used, the pitch should not be so large so that the tote behind the removed tote falls into place immediately.

After loading, the trailers 160 are dispatched (step 50), which in our example would be by 9 p.m. Trailers 160 which have the farthest distance to travel would be loaded first and would leave the warehouse first. Trailers 160 drive to appropriate transfer points 170. Transfer points 170 need not be facilities devoted exclusively to this purpose; transfer points 170 may be, for example, locations that are otherwise unused in the evenings, such as supermarket parking lots or other locations that are not used in the late night/early morning hours, such as between approximately 10 p.m. and 2 a.m. Racks 230 are off loaded by transferring entire racks 230 or entire racks holders 235, either manually or by an automatic mechanism, to awaiting vans 180 (having appropriate rack holders, if the rack holders themselves are not transferred) for delivery to the various customers' homes (step 60). To simplify the off-loading of racks 230 from trailers 160, the floor of each trailer 160 may be at the loading height of van 180 such that van 180 may pull up to the rear or side of trailer 160, depending on where the lift gate (not shown) of the trailer 160 is located, the lift gate is raised, and the racks 230 moved through the opening directly onto the van 180. Where rack holders 235 have rollers and are transferred with racks 230, a rack holder 235 may be rolled easily from trailer 160 to van 180. As each van 180 generally has a route that requires it to deliver less than all of the totes 200 on a single trailer 160 and a rack 230 is to be transferred with totes 200 already on the rack 230, it is preferable to load onto a rack 230 only totes 200 that are to be delivered by a single van 180 so that totes 200 do not have to be shifted between racks 230 at a transfer point 170. A bill of lading and a previously-determined route sheet are also delivered to the van driver.

For increased efficiency, totes 200 are loaded onto the vans 180 in reverse of the order that the totes 200 are to be delivered so that the first tote 200 to be delivered is accessible to the van driver first, the second tote is accessible second, etc. The trailers 160 may also be loaded at warehouse 150 to enable the offloading of totes 200 onto the various vans 180 at transfer point 170 in the desired "reverse" order for more efficient delivery by vans 180.

Figure 5A:
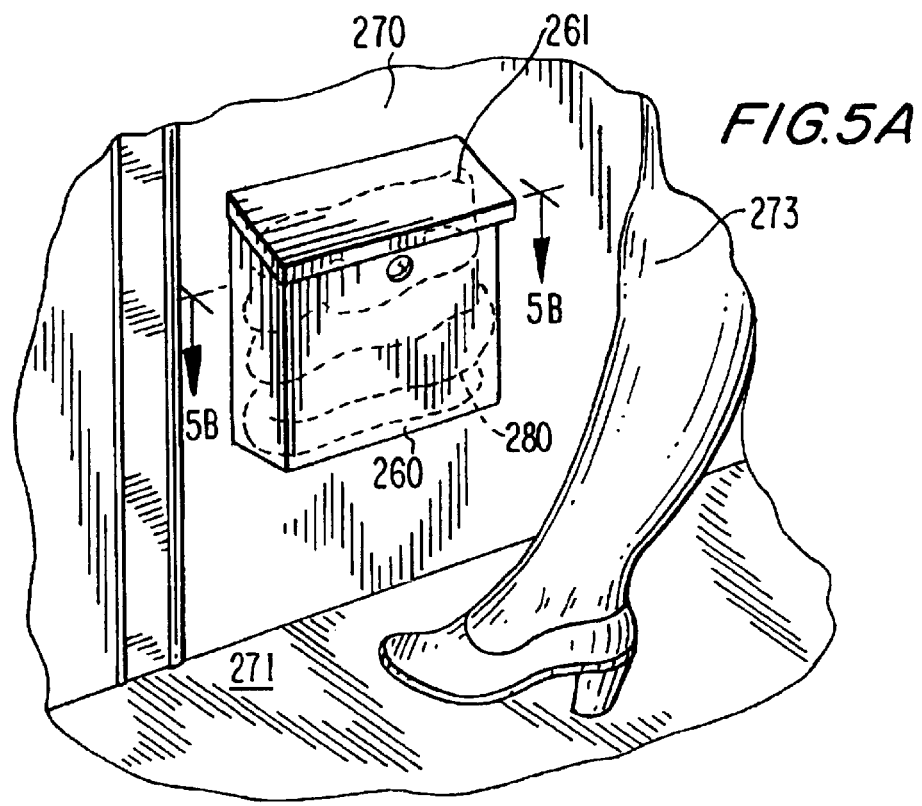
FIG. 5A is a perspective view of a grocery box of the present invention shown mounted to a wall; expandable bag in its collapsed state that is stored within the grocery box when not in use.
Figure 6:
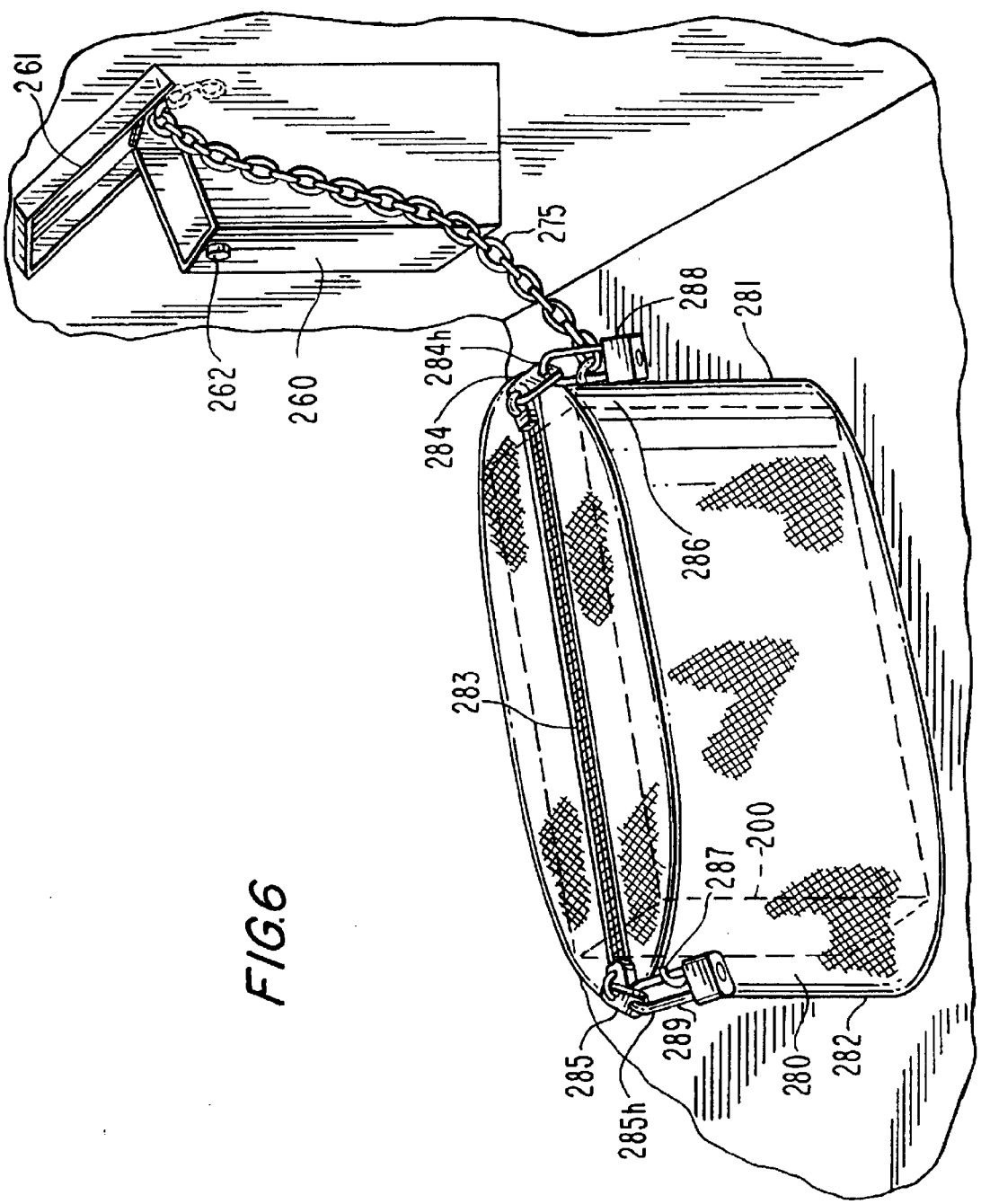
FIG. 6 is an isometric view of the expandable bag of FIG. 5B in its fully expanded state with a two-way zipper used as a means for securing a tote within the bag.

The van drivers start their delivery routes at approximately 1 a.m. and finish by approximately 5 a.m. (step 70). They make deliveries to customers' homes 190 in a sequence that may be determined at the time the order is placed in the computer on a route sheet. Upon reaching a customer's home, the van driver removes the tote 200 from his van and brings it near a grocery box 260 which may be made of stainless steel and is bolted or chained to some place 270 outside a customer's home, such as to a post, a door, a wall, or a floor. FIG. 5A shows one such box 260 mounted to a wall 270 away from floor 271 at a level below the knee 273 of an adult of average height. An expandable, secure bag 280, like a thick nylon or metal mesh net, or an insulated bag which may be pleated and have a Mylar exterior, is stored in the grocery box 260 that is conceptually similar to, but generally smaller than, a milk box (step 80) and large enough to hold the bag 280. When empty, bag 280 is collapsed and folded within grocery box 260. Bag 280 is secured to the grocery box 260 with a chain or cable 275 (FIG. 5B) and the grocery box 260 itself may have a lid 261 that may be locked with lock 262. The driver removes bag 280 from the grocery box 260, unfolds and expands bag 280, and places the tote 200 for that customer in bag 280. The expandable bag 280, when expanded, has first and second sides 281, 282. Tote 200 wrapped in bag 280 is placed on the ground adjacent to grocery box 260 while still attached to grocery box 260 with chain and cable 275 (FIG. 6). Bag 280 should be animal-proof and should be odor-proof so as not to attract animals. Alternatively, the tote 200 wrapped in bag 280 may be placed within grocery box 260 if grocery box 260 is large enough.

Figure 7:
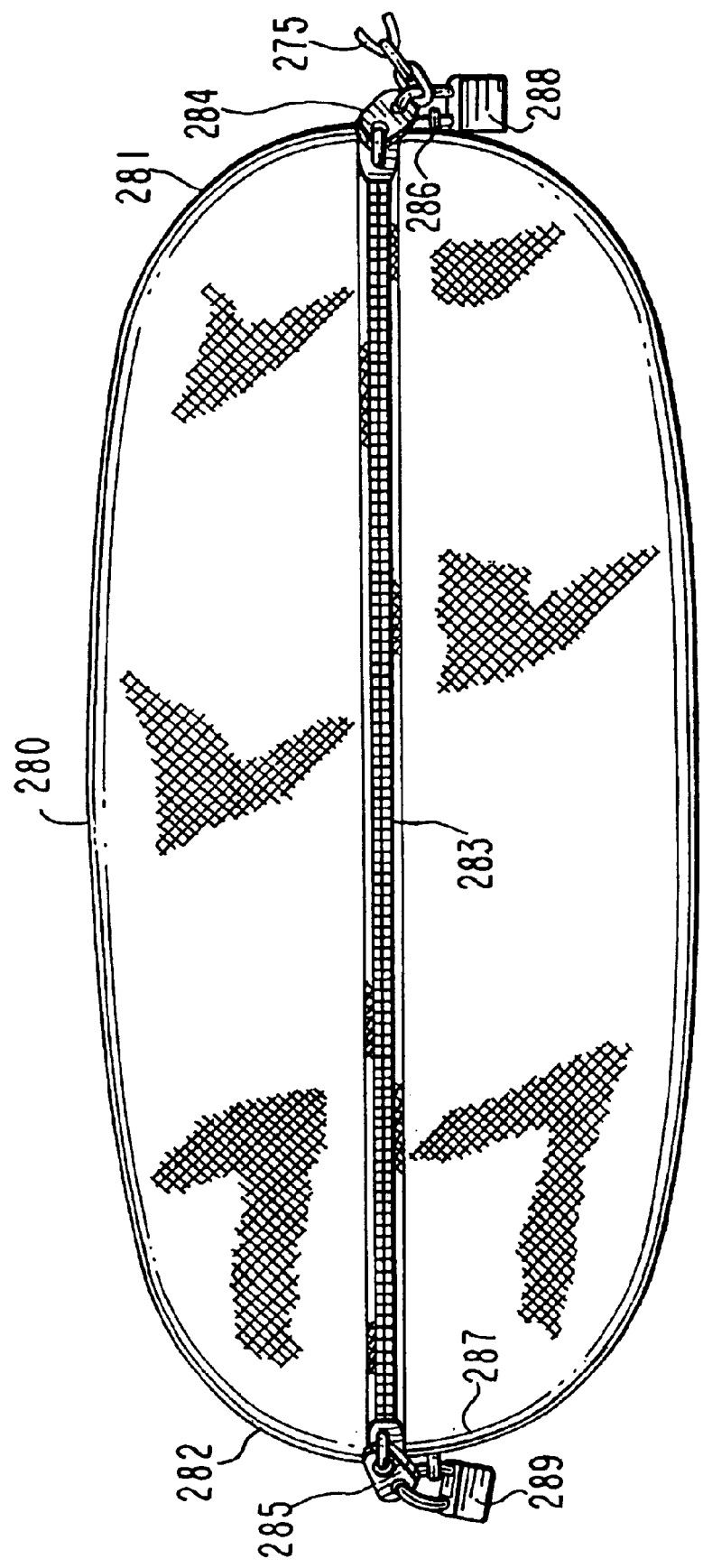
FIG. 7 is a top view of the bag of FIG. 6.

Bag 280 is cinched and locked (step 90) with a locking means to hold tote 200 securely in bag 280. One contemplated locking means is a respective two-way zipper 283 having two sliding pieces 284, 285 to open and close zipper 283 from either end of the zipper 283. (FIG. 7) Adjacent each end of zipper 283 is a respective hook or Ring 286, 287 attached to mesh 280. A first padlock 288 may be looped through a hole 284*h* in the first sliding piece 284 when it is moved to its fully closed position at side 281 and through hook 286 to lock zipper 283 on this first end 281. This padlock 288 may be opened by the van driver to open the bag 280, insert the tote 200 therein, and then relock the bag 280. A second padlock 289 may be looped through a hole 285*h* in the second sliding piece 285 when that piece 285 is in its fully closed position at side 282 and through hook 287 to lock zipper 283 on this second end. The customer can unlock this second padlock 289 to remove the tote 200.

Tote 200 remains locked in bag 280 until the customer retrieves the tote and returns the bag into the grocery box 260 (step 100). The customer thereafter removes the groceries from the tote 200, removes bag 280 from grocery box 260, unlocks the customer padlock on bag 280, places the used tote 200 and any frozen inserts 210, which are nestable, back inside the bag 280 secured to the grocery box 260, and relocks the padlock before the next expected delivery to that customer, for pickup by the van during the next delivery (step 110).

Figure 5C:
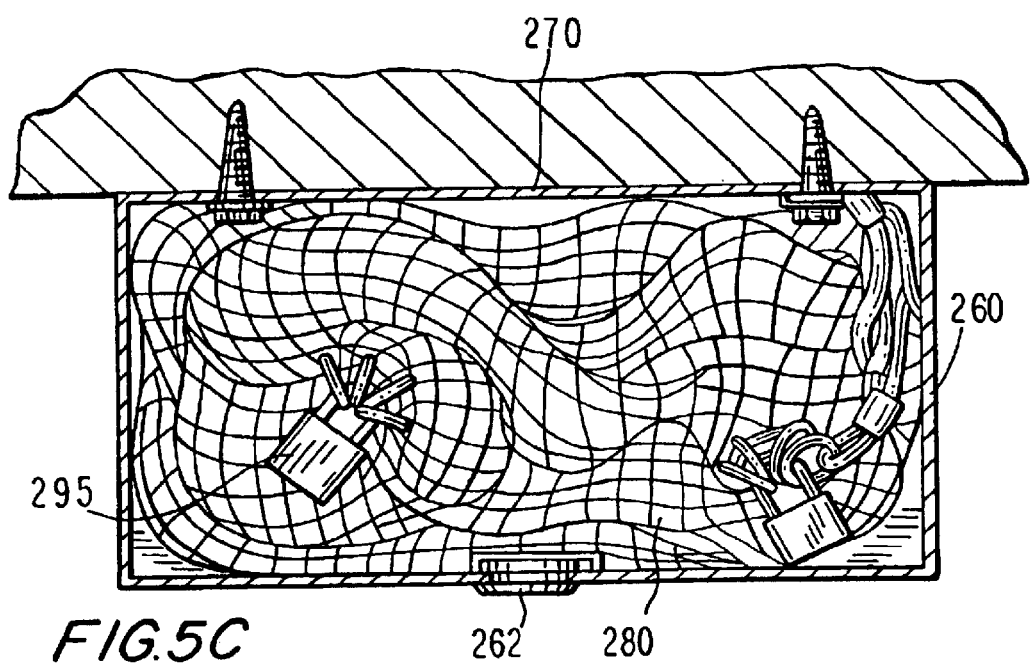
FIG. 5C is a cross-sectional view of the grocery box of FIG. 5A along line 5B—5B with the bag of FIGS. 8A-8C collapsed within the grocery box.
Figure 8A:
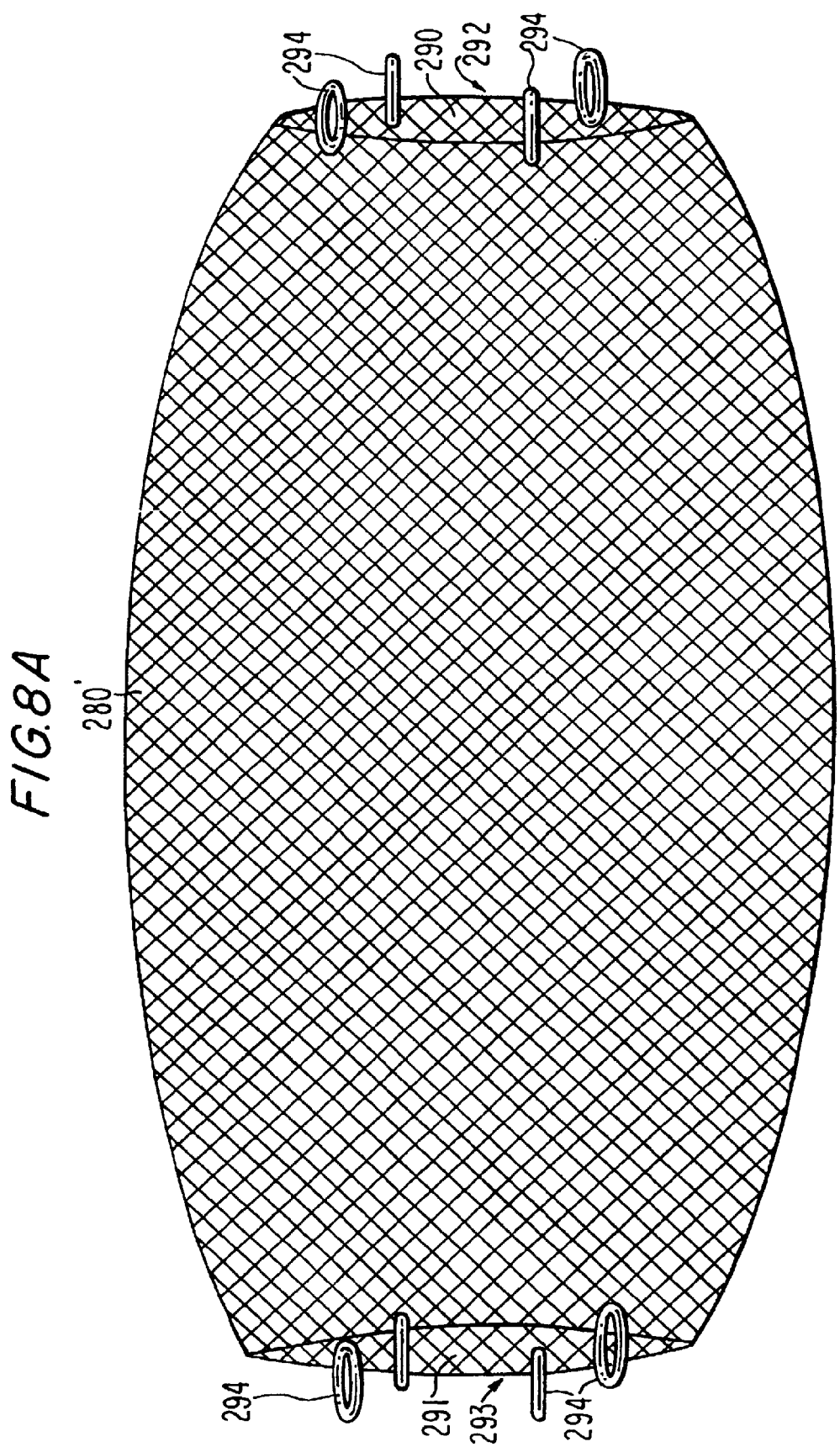
FIG. 8A is a top view of an alternative bag used as a means for securing the tote within the grocery box.
Figure 8B:
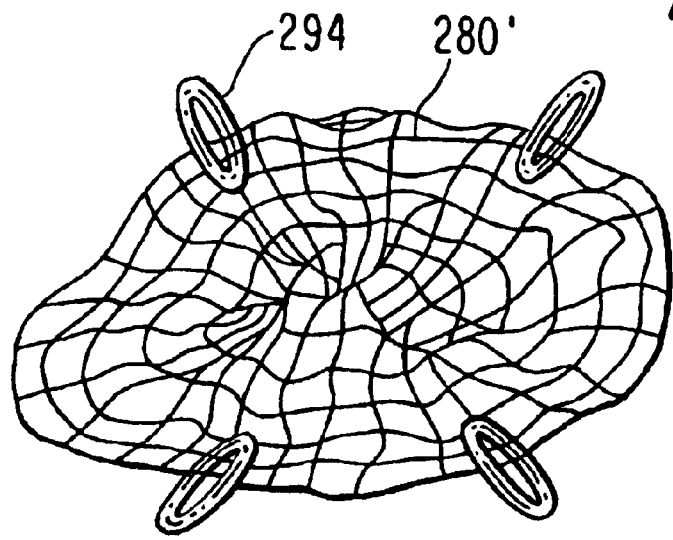
FIG. 8B is a side view of the bag of FIG. 8A with a side of the bag unlocked.
Figure 8C:
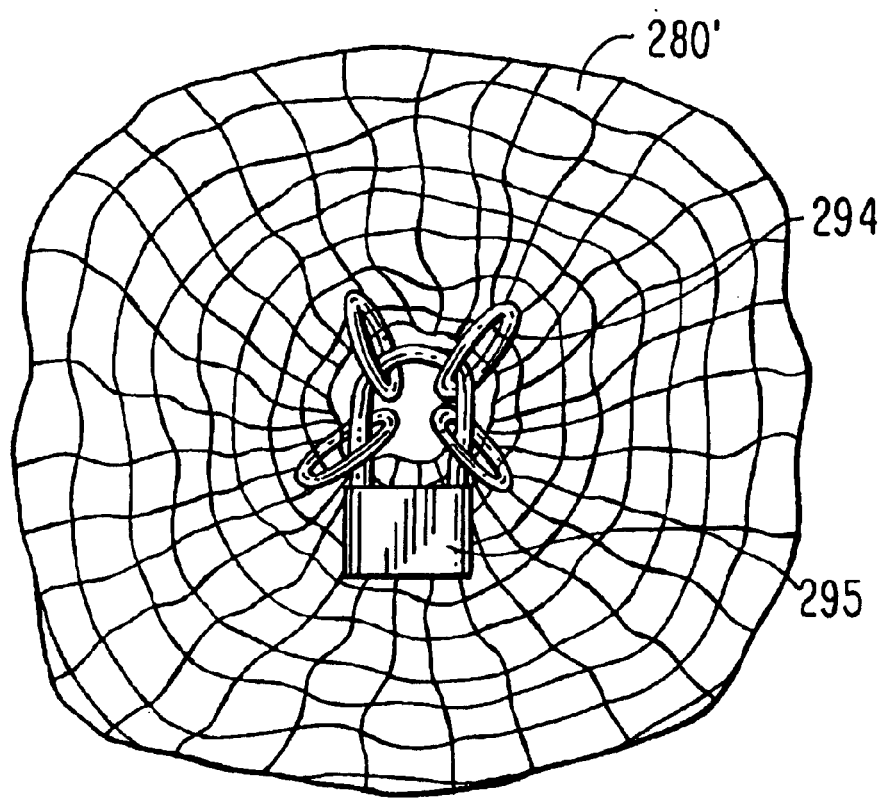
FIG. 8C is a side view of the bag of FIG. 8A with a side of the bag locked.
Figure 9:
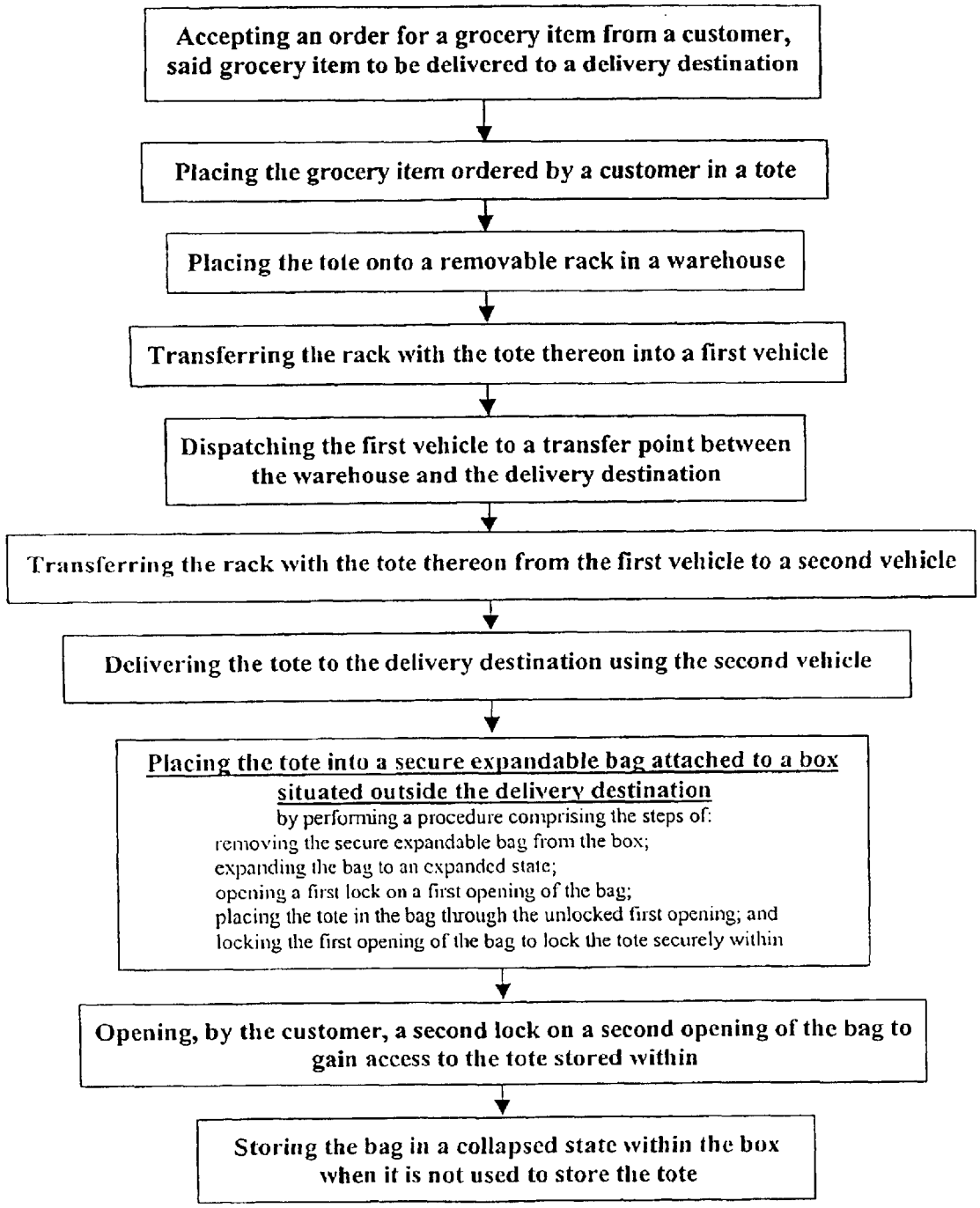
FIG. 9 is a flowchart of a grocery delivery method according to a preferred embodiment of the present invention.

Alternatively, instead of having a zipper 283 as on bag 280, a bag 280' made of a mesh net may be used to secure tote 200. (FIGS. 8A-C) Bag 280' has an opening 290, 291 on each of respective sides 292, 293. A plurality of rings 294 are attached to each of respective sides 292, 293. Rings 294 on each side may be linked together with other rings on that side by hooking a padlock 295 through them. FIG. 8C shows padlock 295 closing side 292 with rings 294. A similar padlock is used to close side 293. Bag 280' is likewise stored in grocery box 260 when not in use (FIG. 5C). To store a tote 200 in bag 280', bag 280' is removed from box 260, padlock 295 is removed, the mesh net 281 is opened, and the van driver inserts tote 200 within mesh 280. The van driver then gathers together rings 294 on side 292, hooks padlock 293 though these rings 294, and locks padlock 295. The customer can remove tote 200 by removing the customer's padlock (not shown) from rings 292 on the opposite side 293 of bag 280'.

After picking up the used totes 200, the van driver nests the emptied totes 200 in one another and returns the nested, emptied totes 200 to the trailer 160 later than evening, at the transfer point 170 to which he travels to pick up filled totes 200 from the warehouse 150 for delivery. The emptied totes are retuned to the warehouse 150 for cleaning and reuse. Customers may be required to put down a deposit to insure against loss or damage to the tote 200 and freezing insert 210. The van driver may also pick up used totes 200 from homes where no deliveries are made. While described with reference to a method of delivering groceries, bag 280 or bag 280' may be used to secure things other than totes 200 of groceries, either in combination with a grocery box 260 of the type described or independently thereof.

The above-described method offers many advantages over the prior art. Because there is no more than approximately a 5 to 6 hour travel radius from warehouse 150 to customer 190, this method of distribution will require fewer supervisors and physical facilities to serve a given population. It will also require less total inventory than systems with shorter travel radii, and will increase inventory turnover and the variety of goods that may be stocked. Other advantages include:

1. Van drivers may serve as auxiliary eyes and ears of the local police as a community service.
2. By delivering to customers' homes between 1 a.m. and 5 a.m., deliveries can be made without worrying about traffic congestion and can use the most fuel efficient routing. This method is also environmentally responsible as early morning deliveries do not slow other vehicles or cause more congestion during business hours and the number of trips required to the supermarkets or grocery stores is reduced. A customer also need not be concerned with finding a parking spot for his car while shopping. The above described method also offers the advantage of eliminating the need for paper or plastic bags to transport the groceries because the groceries are placed in washable totes 200. Moreover, this method provides an easy way for the customer to return cans and bottles for recycling and for obtaining credit for can and bottles for which a deposit is required, such as soda cans. The used cans and bottles may be left in the empty tote 200 and the customer will receive a credit on his account for the return of the deposit. This business method may use electric vans for local deliveries, particularly those with batteries acting as flywheels which absorb mechanical energy on breaking and release on acceleration while supplying stored electrical power to motors.
3. A single sales/service representative can cover a broad area and does not have to be concerned with deliveries, which are made by the van drivers. This may improve customer relations because it may prove difficult to find friendly, competent sales staff. It is therefore helpful to have a single competent person to promote the business to a greater number of potential customers. The sales representative can provide and install the grocery box, provide an introductory coupon, send a persona note on significant occasions, such as birthdays and anniversaries, and guarantee satisfaction by quickly replacing any unsatisfactory products (either by a van dispatched from the warehouse 150 or by purchasing a replacement product at a local source and personally delivering it).
4. This method requires less capital then other grocery delivery methods that promise quick delivery during the daylight hours. As explained above, those other methods require more distribution warehouses because of their necessarily smaller travel radius between their warehouse and their customers' homes. Moreover, to deliver groceries within a short time, such as one half hour, after an order is placed, the delivery trucks may be routed to the customer in an environmentally irresponsible manner.
5. This method eliminates the need for refrigerated vans, which waste an enormous amount of energy as the van door is opened at every delivery point. (Refrigerated trailers must be kept at 35° F.)

Despite the advantages offered by the described method of distributing groceries, some customers may not wish to have their groceries delivered in a secure bag outside their home. These customers can be accommodated by giving them the option of shipping a tote 200 of groceries through another delivery method, such as regular next day delivery by an overnight delivery service such as the United Parcel Service. Using next day delivery, groceries in tote 200 can also be kept at the desired chilled temperature using a similar refrigeration method, such as frozen inserts 210 or chilled gas.

Thus, while it has been shown, described and pointed out, fundamental novel features of the invention as applied to a preferred embodiment thereof, it will be understood that various omissions and substitutions and changes in the form and details of the methods and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

I claim:

1. A method of distributing groceries comprising:
   accepting an order for a grocery item from a customer, said grocery item to be delivered to a delivery destination;
   placing the grocery item ordered by a customer in a tote;
   placing the tote onto a removable rack in a warehouse;
   transferring the rack with the tote thereon into a first vehicle;
   dispatching the first vehicle to a transfer point between the warehouse and the delivery destination;
   transferring the rack with the tote thereon from the first vehicle to a second vehicle;
   delivering the tote to the delivery destination using the second vehicle; and
   placing the tote into a secure expandable bag attached to a box situated outside the delivery destination by performing a procedure comprising the steps of:
      removing the secure expandable bag from the box;
      expanding the bag to an expanded state;
      opening a first lock on a first opening of the bag;
      placing the tote in the bag through the unlocked first opening; and
      locking the first opening of the bag to lock the tote securely within;
   wherein, when the bag is not used to store the tote, it is in a collapsed state and is stored within the box; and
   wherein the customer opens a second lock on a second opening of the bag to gain access to the tote stored within.

* * * * *